(12) United States Patent
Lee

(10) Patent No.: US 8,670,580 B2
(45) Date of Patent: Mar. 11, 2014

(54) ELECTRONIC DEVICE

(75) Inventor: Fang-Ching Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 456 days.

(21) Appl. No.: 13/169,640

(22) Filed: Jun. 27, 2011

(65) Prior Publication Data
US 2012/0230517 A1 Sep. 13, 2012

(30) Foreign Application Priority Data
Mar. 10, 2011 (TW) ............... 100108051 A

(51) Int. Cl.
*H04R 25/00* (2006.01)
*H04R 1/00* (2006.01)

(52) U.S. Cl.
USPC ........... 381/191; 381/424; 381/190; 381/174; 381/175; 381/182; 381/186; 381/163

(58) Field of Classification Search
USPC ........... 381/98, 104, 107, 108, 111, 113, 116, 381/100, 174, 175, 190, 191, 423, 431, 345, 381/150, 424, 182, 186, 163; 455/100, 570, 455/41.3, 149, 350, 379
See application file for complete search history.

(56) References Cited

U.S. PATENT DOCUMENTS 4,704,556 A * 11/1987 Kay ............................ 310/334
8,503,693 B2 * 8/2013 Yu et al. ...................... 381/92

* cited by examiner

*Primary Examiner* — Devona Faulk
*Assistant Examiner* — John St. George
(74) *Attorney, Agent, or Firm* — Birch, Stewart, Kolasch & Birch, LLP

(57) ABSTRACT

An electronic device is provided, including a conductive substrate, an electret diaphragm, a plurality of spacers, a first electrode, and two second electrodes. The conductive substrate has a plurality of openings. The spacers are disposed between the conductive substrate and the electret diaphragm to define an acoustic projecting portion and two acoustic receiving portions on the electret diaphragm. The first electrode is disposed on the acoustic projecting portion and coupled with the conductive substrate for generating an acoustic signal. The second electrodes are disposed on the acoustic receiving portions and coupled with the conductive substrate, wherein the acoustic receiving portions receive the acoustic signal and vibrate to vary an electrical field between the second electrodes and the conductive substrate.

16 Claims, 7 Drawing Sheets

ELECTRONIC DEVICE

CROSS REFERENCE TO RELATED APPILCATIONS

This Application claims priority of Taiwan Patent Application No. 100108051, filed on Mar. 10, 2011, the entirety of which is incorporated by reference herein.

BACKGROUND OF THE INVENTION

1. Field of the Invention

This application relates in general to an electronic device and in particular to an electronic device having an acoustic transducer.

2. Description of the Related Art

In recent years, touch screens have been widely applied in mobile phones and other portable electronic devices. The touch screen is generally used for detecting contact of an object on a surface thereof, but it cannot detect a moving object in 3D space. Conventional distance measuring equipment, such as backup sensor, may detect an object by transmitting and receiving acoustic signals along a single direction. However, conventional distance measuring equipment cannot precisely and in real time, detect direction and velocity of a moving object.

BRIEF SUMMARY OF INVENTION

An object of the application may provide an electronic device, including a conductive substrate, an electret diaphragm, a plurality of spacers, a first electrode, and two second electrodes. The conductive substrate has a plurality of openings. The spacers are disposed between the conductive substrate and the electret diaphragm to define an acoustic projecting portion and two acoustic receiving portions on the electret diaphragm. The first electrode may be disposed on the acoustic projecting portion and coupled with the conductive substrate for generating an acoustic signal. The second electrodes may be disposed on the acoustic receiving portions and coupled with the conductive substrate, wherein the acoustic receiving portions receive the acoustic signal and vibrate to vary an electrical field between the second electrodes and the conductive substrate.

BRIEF DESCRIPTION OF DRAWINGS

The disclosure may be more fully understood by reading the subsequent detailed description and examples with references made to the accompanying drawings, wherein.

DETAILED DESCRIPTION OF INVENTION

Figure 1:
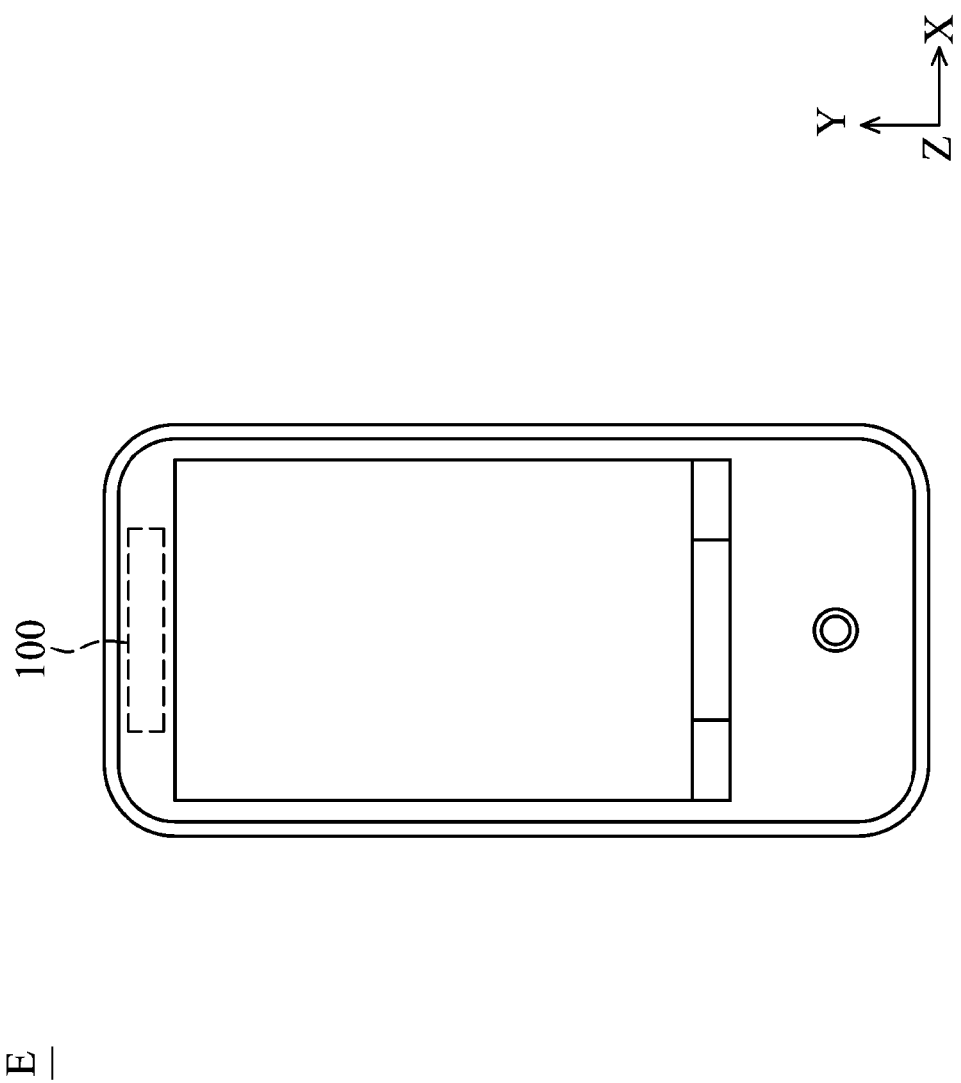
FIG. 1 is a perspective diagram of an electronic device according to an embodiment of the disclosure.

Referring to FIG. 1, an embodiment of an electronic device E may be a mobile phone, comprising a screen and an acoustic transducer 100 on a top side of the screen. The acoustic transducer 100 may be conventionally used as a microphone and a micro speaker. Additionally, the acoustic transducer 100 may also be used as a sensor for detecting the motion of an object in front of the electronic device E.

Figure 2:
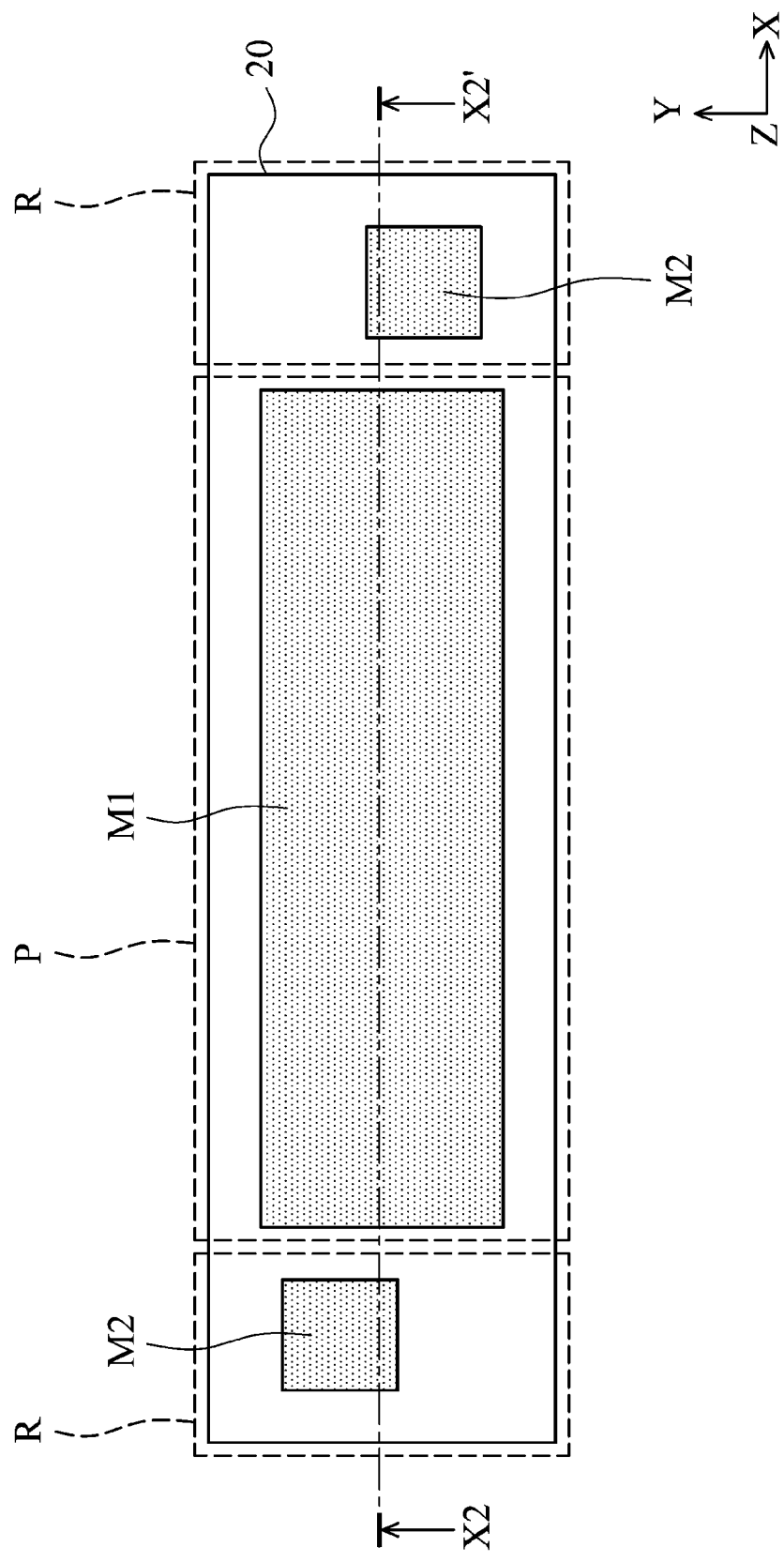
FIG. 2 is a top view of an acoustic transducer according to an embodiment of the disclosure.
Figure 3A:
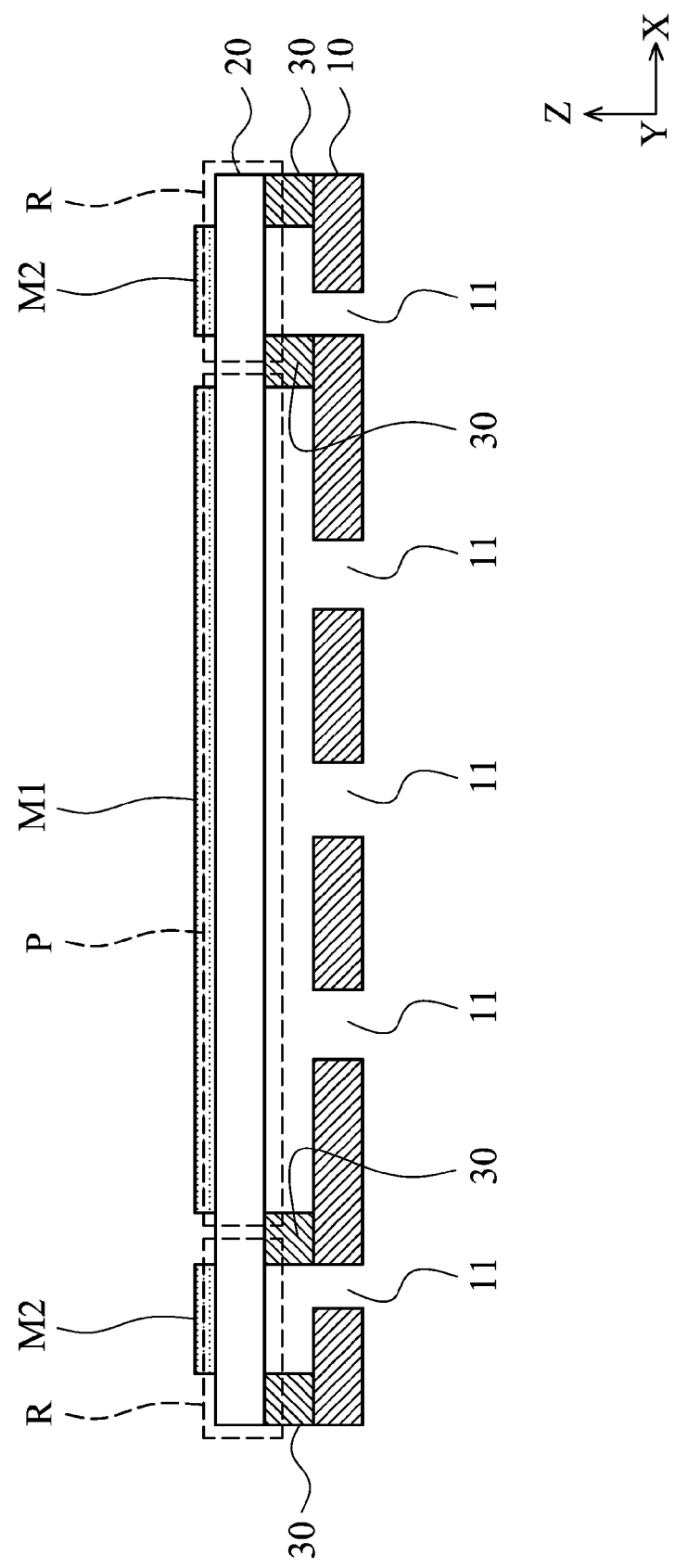
FIG. 3A is a sectional view along line X2-X2' of FIG. 2.

Referring to FIGS. 2 and 3A, the acoustic transducer 100 primarily comprises a conductive substrate 10, an electret diaphragm 20, a plurality of spacers 30, a first electrode M1, and two second electrodes M2. The spacers 30 are disposed between the conductive substrate 10 and the electret diaphragm 20, so as to form several hollow chambers between the conductive substrate 10 and the electret diaphragm 20.

As shown in FIGS. 2 and 3A, since the electret diaphragm 20 and the spacers 30 are fixed to each other at some stationary portions without vibration, an acoustic projecting portion P and two acoustic receiving portions R are defined for transmitting and receiving acoustic signals, wherein the acoustic projecting portion P is between the acoustic receiving portions R.

The first electrode M1 and the second electrodes M2 are respectively disposed on the acoustic projecting portion P and the acoustic receiving portions R. In this embodiment, the second electrodes M2 are symmetrically positioned with respect to the first electrode M1. When the electrical field between the first electrode M1 and the conductive substrate 10 is changed, the acoustic projecting portion P is driven to generate a specific acoustic signal. Subsequently, the acoustic signal can be reflected by an object and received by at least one of the acoustic receiving portions R. The acoustic receiving portion R vibrates when receiving the acoustic signal, and changes the electrical field between the second electrodes M2 and the conductive substrate 10. Thus, the acoustic signal may be transformed into a voltage signal for detecting moving direction and velocity of an object.

In this embodiment, the acoustic projecting portion P and the acoustic receiving portions R are substantially arranged along the X axis (first direction), and the centers of the second electrodes M2 are located at different positions along the Y axis (second direction). That is, the second electrodes M2 may not be only spaced apart by a distance along the X axis, but also have different coordinates along the Y axis. Thus, moving direction and velocity of an object along X and Y axes may be detected by the acoustic transducer 100.

Figure 4:
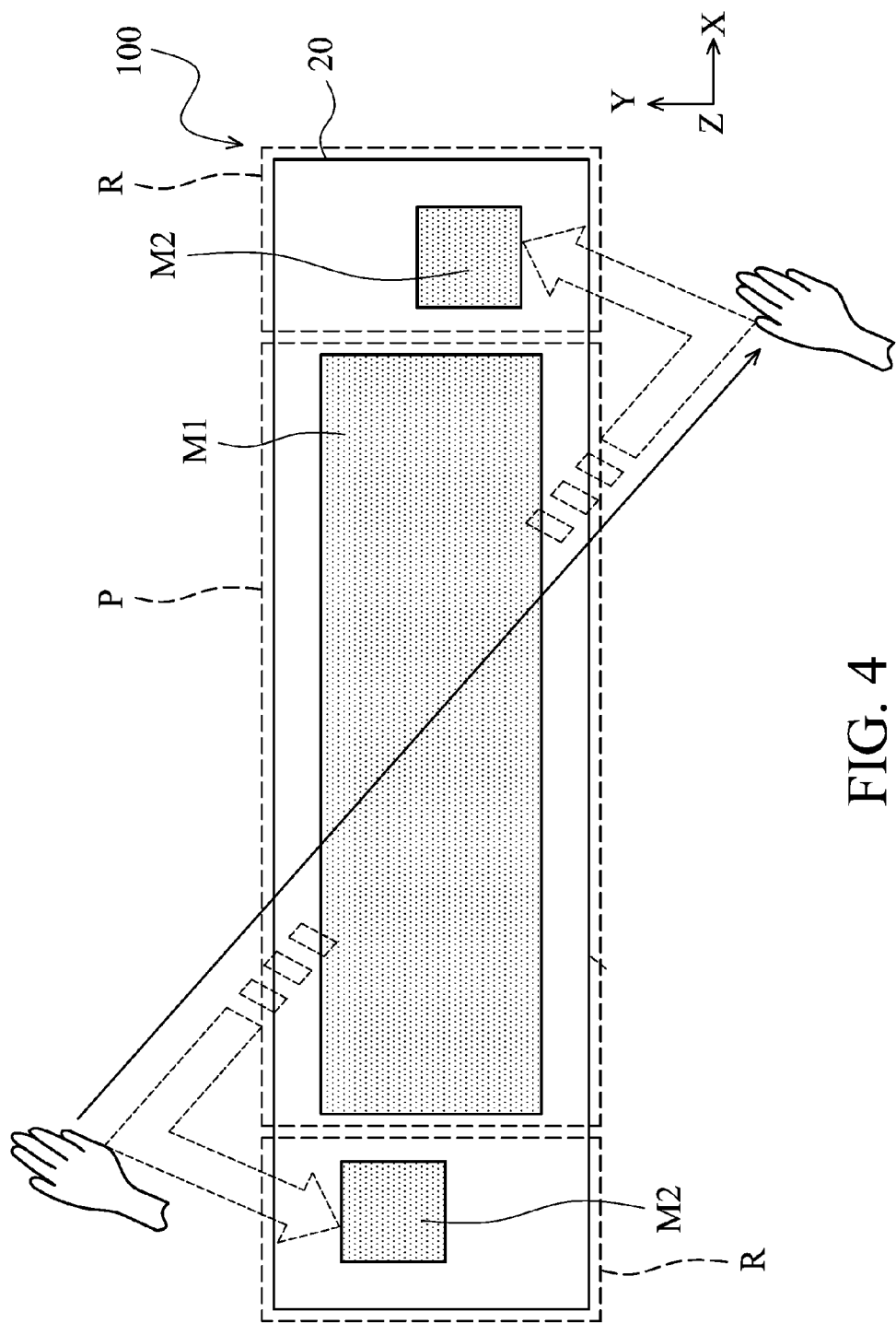
FIG. 4 is perspective diagram illustrating an acoustic transducer detecting a moving object according to an embodiment of the disclosure.

Referring to FIG. 4, when an object (such as a user's hand) is situated on the left upper side of the acoustic transducer 100, the acoustic signal from the acoustic projecting portion P is reflected by the object and received by the acoustic receiving portions R on the left side of the acoustic transducer 100. Thus, the electrical field between the left second electrode M2 and the conductive substrate 10 is changed, and the acoustic signal may be transformed into a voltage signal to detect the position of the object.

Subsequently, when the object moves from the left upper side to the right lower side of the acoustic transducer 100, the acoustic signal from the acoustic projecting portion P is reflected by the object and received by the acoustic receiving portions R on the right side of the acoustic transducer 100. Thus, the electrical field between the right second electrode M2 and the conductive substrate 10 is changed, and the acoustic signal may be transformed into a voltage signal to detect the position of the object. Since the voltage signals generated by the left and right second electrodes M2 occur at different times, the moving direction and velocity of an object may be calculated according to the voltage signals.

Figure 3B:
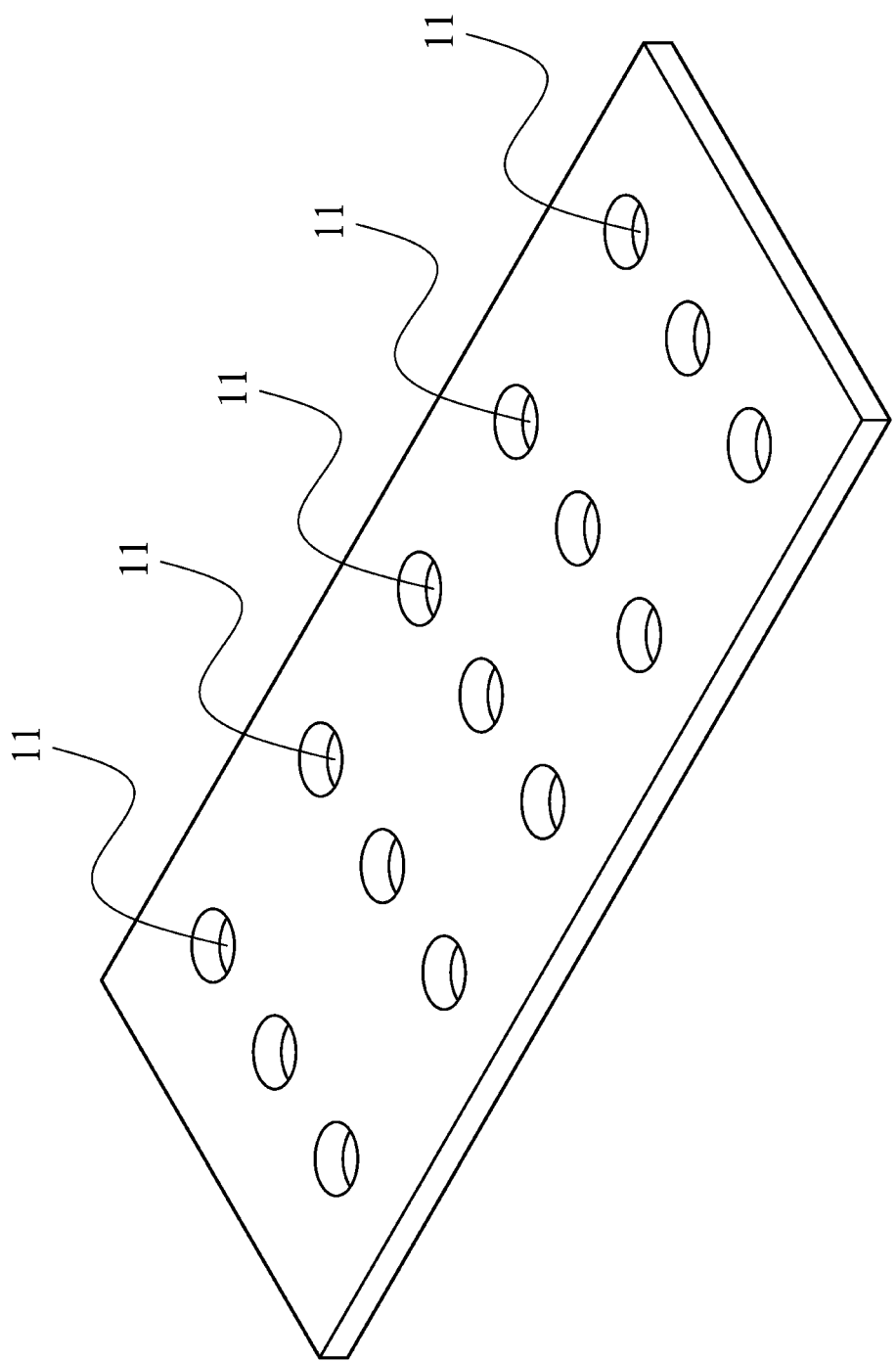
FIG. 3B is perspective diagram of a conductive substrate according to an embodiment of the disclosure.

Referring to FIGS. 3A and 3B, the conductive substrate 10 may be a metal plate with a plurality of openings 11 formed thereon, whereby the air pressure may be released through the openings 11 during vibration of the electret diaphragm 20. Additionally, the spacers 30 may comprise conductive or insulating material, and the first and second electrodes M1 and M2 may comprise Al, Cr, or indium tin oxide (ITO). The electret diaphragm 20 may comprise silicon dioxide, trifluoroethanol (TFE), expanded polytetrafluoroethylene (ePTFE), or fluorine-containing polymer. In this embodiment, the thickness of the electret diaphragm 20 may be between 5-50 um, the thickness of the first and second electrodes M1 and M2 may be between 0.7-1 um, and the thickness of the spacer 30 may be between 50-500 um.

Figure 5:
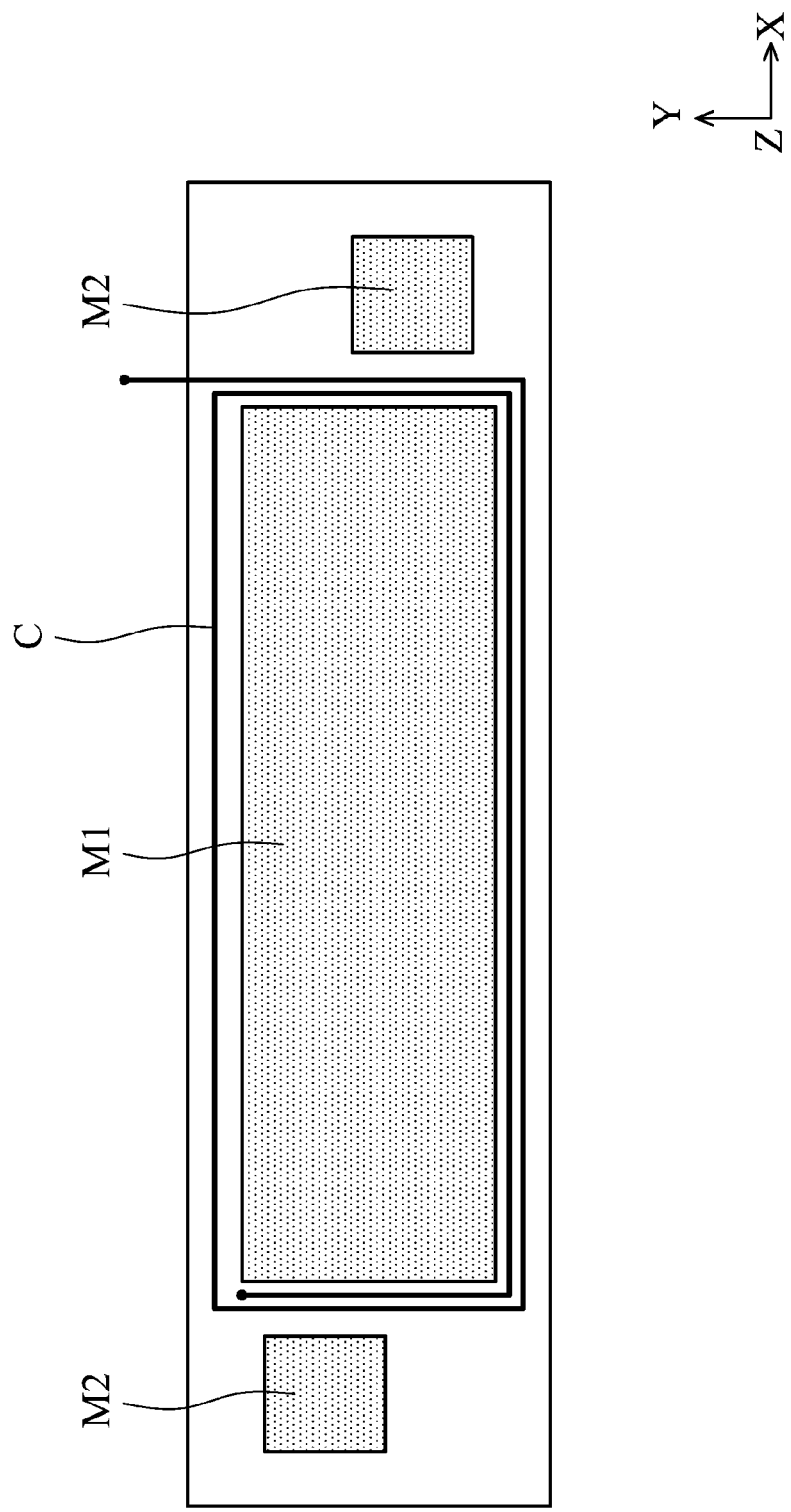
FIG. 5 is a top view of an acoustic transducer according to another embodiment of the disclosure.

In another embodiment, a coil C may be disposed on the electret diaphragm 20 and surround the first electrode M1, as shown in FIG. 5. The coil C may be coupled with a hearing aid receiver, such that users may hear voice by the coil C inducing a corresponding current in a hearing aid receiver.

Figure 6:
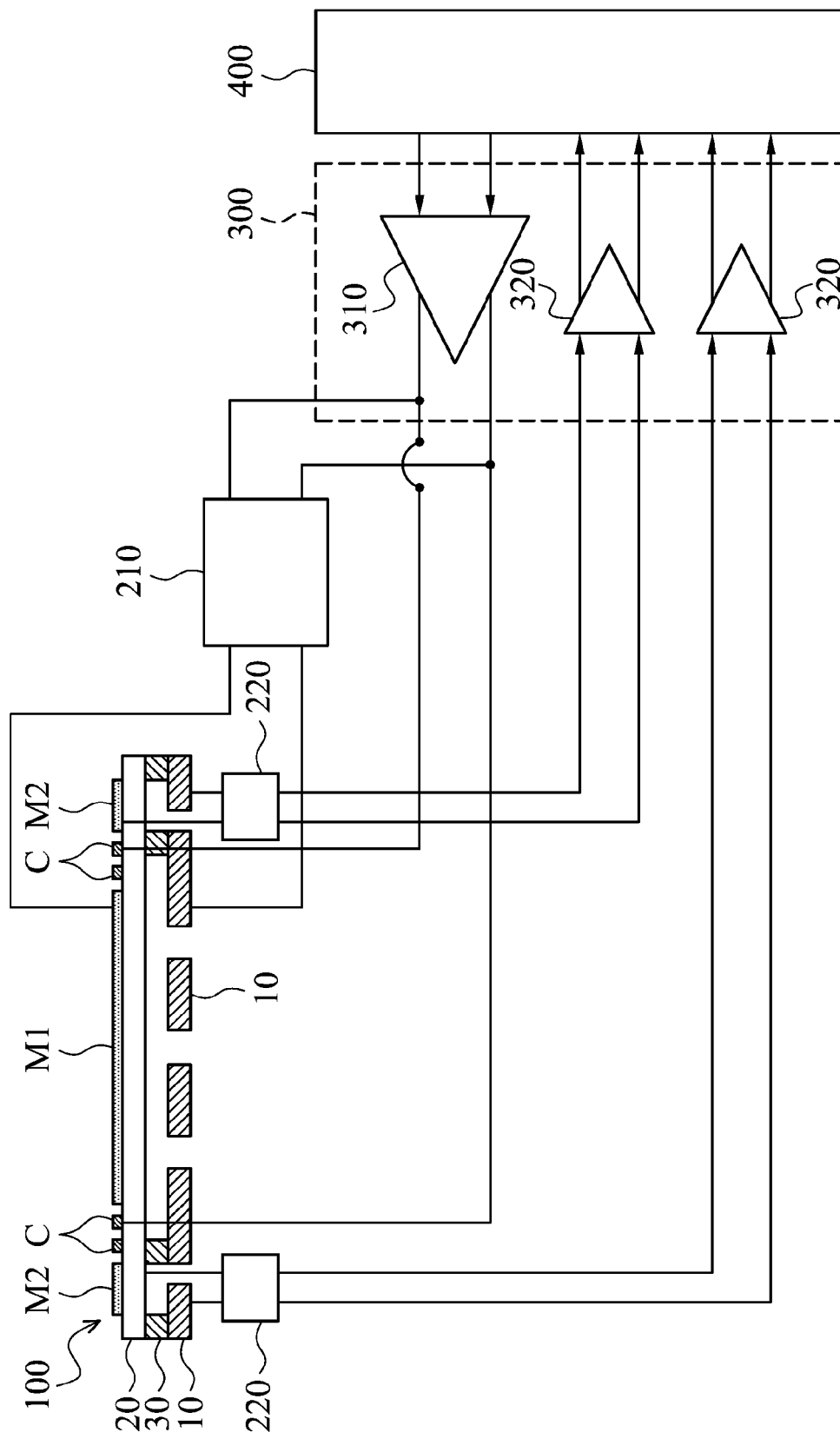
FIG. 6 is perspective diagram of an acoustic transducer connected to a circuit system in an electronic device.

FIG. 6 is a perspective diagram of the acoustic transducer 100 of FIG. 5 connected to a circuit system in the electronic device E. As shown in FIG. 6, the circuit system comprises a codec circuit 300 and a digital signal processor 400. The codec circuit comprises an audio power amplifier 310 and two microphone amplifiers 320. The digital signal processor 400 connects to the input end of the audio power amplifier 310 and the output ends of the microphone amplifiers 320. Furthermore, the first electrode M1 and the conductive substrate 10 are connected to the output end of the audio power amplifier 310, and the second electrodes M2 and the conductive substrate 10 are connected to the input ends of the microphone amplifiers 320.

In this embodiment, the electronic device E further comprises a transformer 210 disposed in the circuit system. The input end of the transformer 210 connects to the audio power amplifier 310, and the output end of the transformer 210 connects to the first electrode M1 and the conductive substrate 10. Thus, an output voltage from the audio power amplifier 310 may be raised from 2V to 110V, so as to drive the acoustic projecting portion P generating an acoustic signal. Additionally, the output end of the audio power amplifier 310 may further connect to the coil C which surrounds the first electrode M1, such that the users may hear voice with a hearing aid receiver.

The electronic device E may further comprise two JFETs 220 disposed in the circuit system, as shown in FIG. 6. The input end of the JFETs 220 connect to the second electrodes M2 and the conductive substrate 10, and the input end of the JFETs 220 connect to the microphone amplifiers 320 for impedance matching.

The present application provides an electronic device with an acoustic transducer. The acoustic transducer defines an acoustic projecting portion and two acoustic receiving portions, so as to detect moving direction and velocity of an object by reflecting an acoustic signal. In some embodiments, two second electrodes are provided on the acoustic receiving portions, wherein the centers thereof are spaced apart by a distance along the X axis. Moreover, the second electrodes have different coordinates along the Y axis. Thus, moving direction and velocity of an object on XY plane may be detected by the acoustic transducer.

Since the acoustic transducer not only functions as a microphone and micro speaker, but also generates and receives acoustic signals for moving object detection, it may be widely applied in mobile phones or other electronic devices. In some embodiments, the acoustic transducer may be applied within the frequency range of 18K-22 KHz, which include parts of the range of human hearing and ultrasound. The acoustic transducer may also be incorporated into an audio codec circuit of a mobile phone or smart phone.

While the disclosure has been described by way of example and in terms of preferred embodiment, it may be to be understood that the disclosure is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a conductive substrate, having a plurality of openings;
   an electret diaphragm, having two acoustic receiving portions and an acoustic projecting portion between the acoustic receiving portions;
   a plurality of spacers, disposed between the conductive substrate and the electret diaphragm to define the acoustic projecting portion and the acoustic receiving portions;
   a first electrode, disposed on the acoustic projecting portion and coupled with the conductive substrate for generating an acoustic signal; and
   two second electrodes, respectively disposed on the acoustic receiving portions and coupled with the conductive substrate, wherein the acoustic receiving portions receive the acoustic signal and vibrate to vary an electrical field between the second electrodes and the conductive substrate.

2. The electronic device as claimed in claim 1, wherein the acoustic projecting portion and the acoustic receiving portions are arranged along a first direction, and the centers of the second electrodes are located at different positions along a second direction perpendicular to the first direction.

3. The electronic device as claimed in claim 2, wherein the second electrodes are symmetrically positioned with respect to the first electrode.

4. The electronic device as claimed in claim 1, wherein the acoustic signal generated from the acoustic projecting portion is reflected by an object and received by the acoustic receiving portions for motion detection of the object.

5. The electronic device as claimed in claim 1, wherein the acoustic signal has a frequency between 18 KHz to 22 KHz.

6. The electronic device as claimed in claim 1, wherein the electret diaphragm comprises silicon dioxide, trifluoroethanol (TFE), expanded polytetrafluoroethylene (ePTFE), or fluorine-containing polymer.

7. The electronic device as claimed in claim 1, wherein the first and second electrodes comprise Al, Cr, or indium tin oxide (ITO).

8. The electronic device as claimed in claim 1, wherein the conductive substrate comprises metal.

9. The electronic device as claimed in claim 1, wherein the spacer comprises insulating material.

10. The electronic device as claimed in claim 1, wherein the thickness of the electret diaphragm is between 5-50 um, the thickness of the first and second electrodes is between 0.7-1 um, and the thickness of the spacer is between 50-500 um.

11. The electronic device as claimed in claim 1, wherein the electronic device further comprises a coil disposed on the electret diaphragm and surrounding the first electrode.

12. The electronic device as claimed in claim 1, wherein the electronic device further comprises a codec circuit and a digital signal processor, and the codec circuit comprises an audio power amplifier and two microphone amplifiers, wherein the digital signal processor connects to the input end of the audio power amplifier and the output ends of the microphone amplifiers, the output end of the audio power amplifier connects to the first electrode and the conductive substrate, and the input ends of the microphone amplifiers connect to the second electrodes and the conductive substrate.

13. The electronic device as claimed in claim 12, wherein the electronic device further comprises a transformer, the input end of the transformer connects to the audio power amplifier, and the output end of the transformer connects to the first electrode and the conductive substrate.

14. The electronic device as claimed in claim 12, wherein the electronic device further comprises two JFETs, the input ends of the JFETs connect to the second electrodes and the conductive substrate, and the input ends of the JFETs connect to the microphone amplifiers.

15. The electronic device as claimed in claim 12, wherein the electronic device further comprises a coil disposed on the electret diaphragm and surrounding the first electrode.

16. The electronic device as claimed in claim 15, wherein the output end of the audio power amplifier further connects to the coil.

* * * * *